(No Model.)

J. P. METZGER.
JOURNAL BEARING FOR RAILROAD AXLES.

No. 514,485. Patented Feb. 13, 1894.

WITNESSES:
F. E. Gaither.
T. J. Hogan.

INVENTOR,
J. P. Metzger,
by J. Snowden Bell
Att'y.

THE NATIONAL LITHOGRAPHING COMPANY,
WASHINGTON, D. C.

UNITED STATES PATENT OFFICE.

JULES P. METZGER, OF PATERSON, NEW JERSEY, ASSIGNOR TO THE LESLIE BROTHERS MANUFACTURING COMPANY, OF SAME PLACE.

JOURNAL-BEARING FOR RAILROAD-AXLES.

SPECIFICATION forming part of Letters Patent No. 514,485, dated February 13, 1894.

Original application filed September 14, 1893, Serial No. 485,494. Divided and this application filed November 17, 1893. Serial No. 491,240. (No model.)

*To all whom it may concern:*

Be it known that I, JULES P. METZGER, of Paterson, in the county of Passaic and State of New Jersey, have invented a certain new and useful Improvement in Journal-Bearings for Railroad-Axles, of which improvement the following is a specification.

In an application for Letters Patent filed by me September 14, 1893, Serial No. 485,494, of which this application is a division, I set forth a journal bearing of the class or type in which provision is made for the self adjustment of the bearing within and relatively to the journal box in which it is carried, in conformity to variations in the angular relation of the axle thereto, due to vertical and horizontal movements of the axle, an instance of such type being exemplified in Letters Patent of the United States No. 405,040, granted and issued to Edward Leslie under date of June 11, 1889.

The object of my present invention is, as in that of my application Serial No. 485,494 aforesaid, to provide a journal bearing of the above recited class or type, which shall be of greater sensitiveness as to adjustments than heretofore; in which the fitting of abutting members and the lubrication thereof, as practiced in prior constructions, can be dispensed with; which shall provide a proper end stop for the axle; and in which the bearing proper or brass may conform to the master car builders' standard now in general use.

It is a further object of my invention to simplify and economize the construction and maintenance of the appliance by effecting a reduction in the number of its parts.

The improvement claimed is hereinafter fully set forth.

Figure 1:
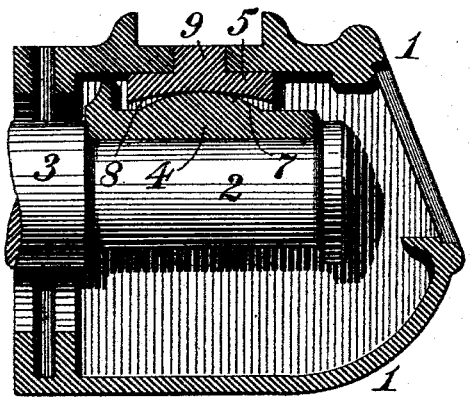
Figure 2:
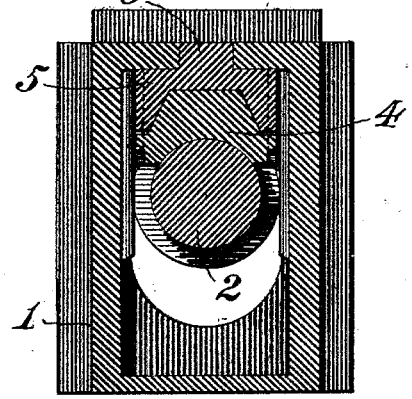
Figure 3:
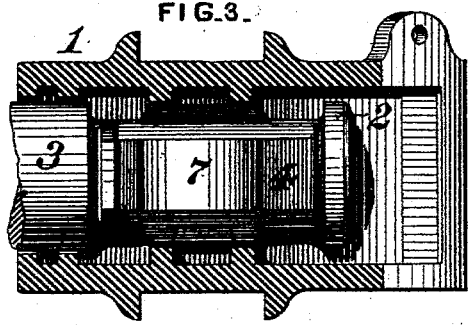
Figure 4:
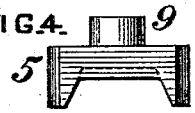
Figure 5:
Figure 6:
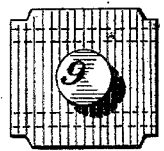
Figure 7:
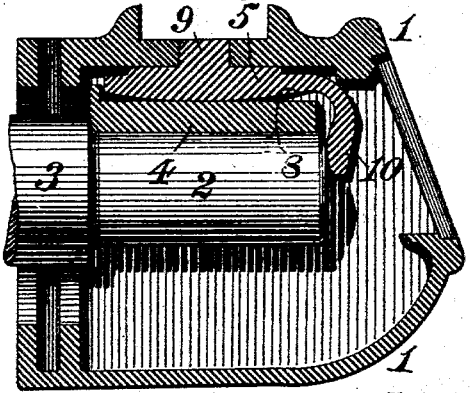

In the accompanying drawings: Figure 1 is a vertical longitudinal central section through a journal box and bearing illustrating an application of my invention; Fig. 2, a transverse section through the same; Fig. 3, a horizontal section through the journal box, with parts therein shown in plan view; Fig. 4, an end view of the intermediate plate; Fig. 5, a longitudinal central section through the same; Fig. 6, a plan or top view of the same; Fig. 7, a longitudinal section through the box and bearing illustrating a construction in which the intermediate plate is provided with an end stop for the axle, and Figs. 8 and 9, similar views showing modified forms of the bearing faces.

My present invention is an improvement upon that of Letters Patent No. 405,040 aforesaid, and, as in that of said Letters Patent, employs an "intermediate plate," interposed between the journal bearing or brass and the journal box, and adapted to admit of the self adjustment of the bearing in vertical and horizontal movements of the axle.

My improvement consists, generally stated, in the combination of a journal box, a journal bearing, and an intermediate plate interposed between the journal bearing and journal box, and pivoted vertically to the latter, said intermediate plate abutting against and being in contact with the journal bearing only at and adjacent to a common transverse plane; also, in the combination of a journal box, a journal bearing, an intermediate plate interposed between the journal bearing and journal box and pivoted vertically to the latter, said intermediate plate abutting against and being in contact with the journal bearing only at and adjacent to a common transverse plane, and an end stop for an axle formed integral with the intermediate plate.

In the practice of my invention, referring first to Figs. 1 to 6 inclusive, I provide a journal box 1 of the ordinary standard type, which is adapted to receive the journal 2 of a car or locomotive engine axle 3. A journal bearing or brass 4, the under or inner side of which is recessed, in conformity with the curvature of the periphery of the journal 2, is fitted thereon in the usual manner, and an intermediate plate 5, through which the portion of the weight of the car or engine which is borne by the journal 2 is transmitted thereto, is interposed between the journal bearing 4 and the top of the box 1. A longitudinally curved bearing face 7 is formed upon the top of the journal bearing 4, and the adjacent side of the intermediate plate 5 is recessed to form a bearing face 8, the radius of curvature of which is materially greater than that of the bearing face 7, so that the bearing faces 7 and 8 abut, not throughout their length as in prior constructions, but only in and adjacent to a transverse plane, which is normally at the middle of their length. Under such construction and relation of the abutting bearing faces, they are free to oscillate, one upon the other, with all irregularities, however slight, of vertical movement of the axle, and it will be obvious that the bearing faces will operate satisfactorily as ordinarily cast, and without any fitting, and also that lubrication will not be necessary, so that the weakening of the brass and intermediate plate by the oil holes heretofore employed will be avoided.

The lateral or horizontal movements of the axle are provided for by a vertical pivot 9, formed on the top of the intermediate plate 5 and fitting truly in an opening or socket in the top of the journal box 1, and in order to relieve the pivot 9, and also the bearing 4, from shocks due to end movements of the axle, an end stop 10 may, as shown in Fig. 7, be formed upon the front of the key 6, said stop projecting downwardly in front of the journal 2, which, in this case, is collarless, and having a convex surface adjacent thereto, so as to accommodate vertical and horizontal movements of the axle, and obviate liability of impairing the adjustability of the bearing to such angular movements. The end play of the axle is limited to the distance between the end of the journal and the adjacent convex face of the end stop 10.

Figure 8:
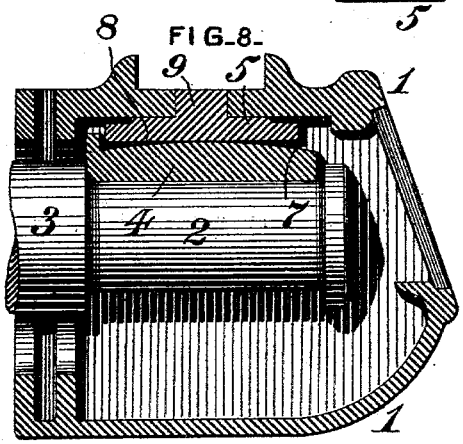

Fig. 8 illustrates a modification in which there is provided the same combination and relation of the journal bearing 4, intermediate plate 5, vertical pivot 9, and journal box 1, as in the instance first described. The bearing 4 is also provided with a longitudinally and upwardly curved bearing face 7 on its top, but the bearing face 8 of the intermediate plate 5, instead of being curved similarly, but to a larger raidius, as before, is, in this case, made flat, thereby causing the bearing faces 7 and 8 to be relieved from contact, except at and adjacent to a single transverse plane, so that the same operative relation of the bearing and intermediate plate as first described is attained.

Figure 9:
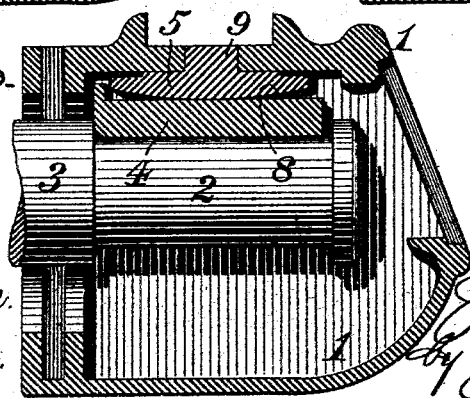

The construction shown in Fig. 9 differs from that last described only in the particular that the bearing face 7 of the journal bearing 4 is made flat, while that of the intermediate plate 5 is longitudinally and downwardly curved. It will be seen that the same operative result, in effecting the contact of said bearing faces only at and near a single transverse plane, is attained as in each of the former instances.

I claim as my invention and desire to secure by Letters Patent—

1. The combination of a journal box, a journal bearing therein, and an intermediate plate interposed between the journal bearing and journal box and pivoted vertically to the latter, the adjacent faces of the journal bearing and intermediate plate abutting and being in contact only at and adjacent to a common transverse plane, substantially as set forth.

2. The combination of a journal box, a journal bearing therein, and an intermediate plate pivoted vertically to the journal box, and provided with a longitudinally curved bearing face abutting against a bearing face on the journal bearing which is not in conformity with the curvature of that of the intermediate plate, substantially as set forth.

3. The combination of a journal box, a journal bearing therein, an intermediate plate through which pressure is transmitted from the box to the bearing, said bearing and intermediate plate abutting only at and adjacent to a common transverse plane, and a vertical pivot fixed to the intermediate plate and fitting an opening or socket in the top of the journal box, substantially as set forth.

4. The combination of a journal box, a journal bearing therein, an intermediate plate interposed between the journal bearing and journal box, and pivoted vertically to the latter, the adjacent faces of the journal bearing and intermediate plate abutting and being in contact only at and adjacent to a common transverse plane, and an end stop for an axle formed integral with the intermediate plate, substantially as set forth.

JULES P. METZGER.

Witnesses:
JOHN BERWICK,
WM. H. LEAZER.